(12) United States Patent
Myneni et al.

(10) Patent No.: US 12,341,163 B2
(45) Date of Patent: Jun. 24, 2025

(54) BATTERY TEMPERATURE MANAGEMENT

(71) Applicant: Apple Inc., Cupertino, CA (US)

(72) Inventors: Krishna Myneni, San Jose, CA (US); Dhruv Khati, San Jose, CA (US); Shiva Krishna Narra, San Jose, CA (US); Sanjeevi Balasubramanian, San Jose, CA (US); Anjaneyulu Maganti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 17/237,572

(22) Filed: Apr. 22, 2021

(65) Prior Publication Data

US 2022/0344728 A1 Oct. 27, 2022

(51) Int. Cl.
*H01M 10/42* (2006.01)
*G05B 15/02* (2006.01)
*G06F 1/26* (2006.01)
*H01M 10/48* (2006.01)
*H02J 7/00* (2006.01)

(52) U.S. Cl.
CPC .......... *H01M 10/425* (2013.01); *G05B 15/02* (2013.01); *G06F 1/263* (2013.01); *H01M 10/486* (2013.01); *H02J 7/0047* (2013.01); *H02J 7/0063* (2013.01); *H01M 2010/4271* (2013.01)

(58) Field of Classification Search
CPC ............. H01M 10/425; H01M 10/486; H01M 2010/4271; H01M 2220/30; H01M 10/4257; H01M 10/443; H01M 10/48; G05B 15/02; G06F 1/263; G06F 1/206; G06F 1/28; G06F 1/3212; G06F 1/329;

(Continued)

(56) References Cited

U.S. PATENT DOCUMENTS

| 8,350,533 B2 | 1/2013 | Tam et al. |
| 9,585,100 B2 | 2/2017 | Law et al. |

(Continued)

FOREIGN PATENT DOCUMENTS

| CN | 107665027 | 2/2018 |
| CN | 108511851 | 9/2018 |

OTHER PUBLICATIONS

International Search Report and Written Opinion from PCT/US2022/023918, dated Oct. 22, 2022, 11 pages.

*Primary Examiner* — Tameem D Siddiquee
(74) *Attorney, Agent, or Firm* — BAKERHOSTETLER

(57) ABSTRACT

Systems of the present disclosure include an electronic device that manages operations in low temperature environments for improved battery performance. Such management can be based on a temperature and/or a charge level of a battery of the electronic device. When the temperature of the battery is below a threshold, the components of the electronic device can be operated to generate heat until the temperature of the battery is at or above the threshold temperature. The operations can be selected and performed based on available charge in the battery, the minimum temperature change that would raise the temperature of the battery to a temperature threshold, the available temperature change that would be induced by performing one or more operations, user inputs, and the like. Such heat generation can allow the electronic device to remain on and maintain its operations despite exposure to an external environment that presents low temperatures.

20 Claims, 6 Drawing Sheets

(58) Field of Classification Search
CPC .... H02J 7/0047; H02J 7/0063; H02J 2310/22; H02J 7/007194; Y02E 60/10
See application file for complete search history.

(56) References Cited

U.S. PATENT DOCUMENTS

| | | | |
|---|---|---|---|
| 10,840,720 B2 | 11/2020 | Yebka et al. | |
| 2009/0037754 A1* | 2/2009 | Cha | G06F 1/206 |
| | | | 713/601 |
| 2010/0277128 A1* | 11/2010 | Tam | H02J 7/007192 |
| | | | 320/150 |
| 2013/0109371 A1* | 5/2013 | Brogan | G06F 1/1639 |
| | | | 361/679.09 |
| 2015/0000889 A1* | 1/2015 | Bellamkonda | G01K 7/42 |
| | | | 165/287 |
| 2016/0059733 A1* | 3/2016 | Hettrich | H04W 4/029 |
| | | | 701/2 |
| 2016/0066266 A1* | 3/2016 | Law | G06F 1/3206 |
| | | | 455/574 |
| 2017/0008419 A1* | 1/2017 | Kim | B60L 58/15 |
| 2017/0187081 A1* | 6/2017 | Kim | H01M 10/615 |
| 2017/0232864 A1* | 8/2017 | Kim | H01M 10/425 |
| | | | 307/10.7 |
| 2017/0264105 A1* | 9/2017 | Sturnfield | H01M 10/443 |

\* cited by examiner

| | BATTERY LEVEL > CHARGE THRESHOLD | BATTERY LEVEL < CHARGE THRESHOLD |
|---|---|---|
| BATTERY TEMPERATURE > TEMPERATURE THRESHOLD | LOW ACTIVITY, LOW TEMP Δ | LOW ACTIVITY, LOW TEMP Δ |
| BATTERY TEMPERATURE < TEMPERATURE THRESHOLD | HIGH ACTIVITY, HIGH TEMP Δ | LOW ACTIVITY, LOW TEMP Δ |

| OPERATIONS | TEMP Δ (°C) |
|---|---|
| OPERATION 1 | +X °C |
| OPERATION 2 | +Y °C |
| OPERATION 3 | +Z °C |

BATTERY TEMPERATURE MANAGEMENT

TECHNICAL FIELD

The present description relates generally to management of electronic devices during operation in low temperature environments, including battery temperature management.

BACKGROUND

Mobile computing devices are becoming increasingly popular in modern society. As device manufacturers are now making millions of mobile computing devices, there is increasing demand for devices with improved performance and features. Battery performance is one area that may limit device performance. Batteries convert chemical energy into electrical energy to power an electronic device in various operational modes. A battery is typically designed to have a particular power, voltage, and current rating that relate to a capacity of the battery for supplying charge to an electronic device during use. By way of example, lithium-ion batteries are popular amongst device manufacturers due to their high energy density and low rate of self-discharge. However, the terminal voltage of a lithium-ion battery type typically varies during discharge, due in part to its physical and chemical characteristics.

Large and/or sudden changes to the terminal voltage of a battery may result in an unexpected power down of an electronic device. For example, if the battery terminal voltage drops below the minimum operating voltage of an electronic device (or a subsystem thereof), the electronic device may lose power (or the subsystem may brown out).

BRIEF SUMMARY OF THE DISCLOSURE

Embodiments of the present disclosure include an electronic device that comprises a battery, a memory storing a list of operations and, for each listed operation, an amount of heat provided by performing the corresponding operation. The electronic device can further include a controller configured to detect when a temperature of the battery is below a temperature threshold. The controller can also determine a minimum amount of heat to raise the temperature of the battery to the temperature threshold and select one of the operations based at least in part on a comparison of the minimum amount of heat and the amount of heat provided by performing the selected operation. The controller can then perform the selected operation until the temperature of the battery is at or above the temperature threshold.

Embodiments of the present disclosure also include a method that comprises detecting when a temperature of a battery of an electronic device is below a temperature threshold. A minimum amount of heat to raise the temperature of the battery to the temperature threshold can be determined. A selected operation can be selected from a list based at least in part on a comparison of the minimum amount of heat and an amount of heat provided by performing the selected operation. The selected operation can be performed until the temperature of the battery of the battery is at or above the temperature threshold.

Embodiments of the present disclosure also include an electronic device that comprises a battery, a component, and a controller. The controller can be configured to detect a battery temperature of the battery and a battery level. While the battery temperature is above a temperature threshold, the controller can operate the component at a first activity level to produce heat at a first level. While the battery temperature is below the temperature threshold and the battery level is above a charge threshold, the controller can operate the component at a second activity level to produce heat at a second level, greater than the first level, to raise the battery temperature.

The description in this summary section may provide some illustrative examples of the disclosure. This section is not intended to be a broad overview or to identify essential elements of the disclosure.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein include devices that are configured for management of operations in low temperature environments, and, more particularly, to battery temperature management. Changes in battery terminal voltage may be dependent, at least in part, upon the temperature of the battery. Therefore it can be beneficial to maintain certain levels of battery voltage by managing the temperature of the battery. Such management can be based on a temperature and/or a charge level of a battery of an electronic device. When the temperature of a battery is below a threshold, the components of the electronic device can be operated to generate heat until the temperature of the battery is at or above the threshold temperature. The operations can be selected and performed based on available charge in the battery, the minimum temperature change to raise the temperature of the battery to the temperature threshold, user inputs, and the like. Such temperature management can allow the electronic device to remain on and maintain its operations despite exposure to an external environment that presents low temperatures.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
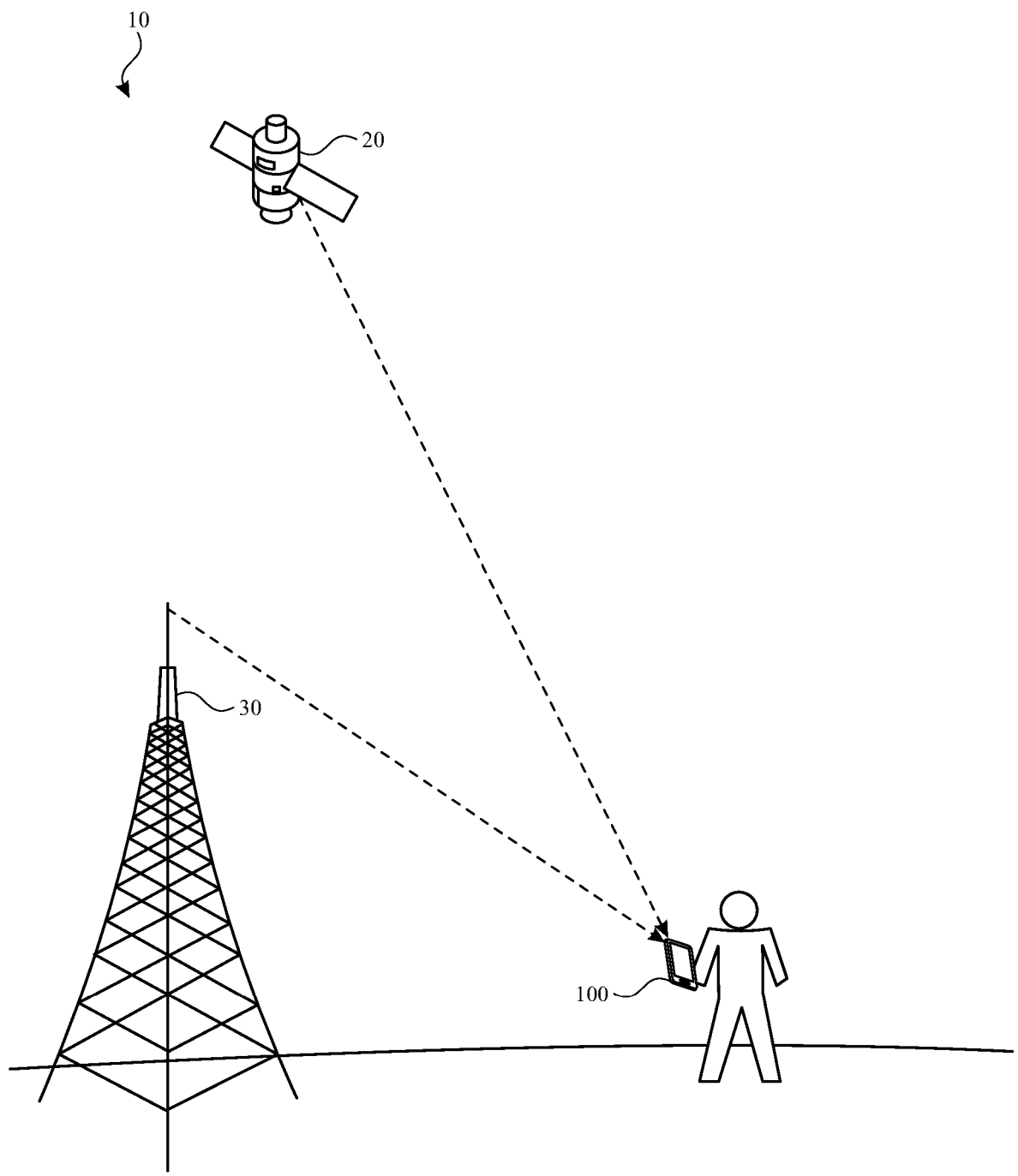
FIG. 1 illustrates a perspective view of a system with an electronic device in use, in accordance with some embodiments of the present disclosure.

FIG. 1 depicts an electronic device 100 in use. As shown in FIG. 1, the electronic device 100 can optionally be a device that is portable, mobile, and/or handheld. For example, the electronic device 100 can be moved to a variety of environments such that it may be subjected to a broad range of environmental conditions. For example, at least some environments can provide low temperature conditions that can reduce the temperature of the electronic device 100 and/or the components thereof.

With some electronic devices, use and other operations thereof can be performed while the electronic device is exposed to the external environment. Whereas certain electronic devices can be stowed (e.g., in a pocket, luggage, container, etc.), the electronic devices can also be operated while not stowed (e.g., while exposed to an external environment). For example, some electronic devices can provide interactive features for use by a user when held or worn by the user. Such features can include a capability to provide outputs to a user and/or receive inputs from the user. By further example, an electronic device can perform functions effectively while not stowed. Such functions can include wireless communication with other devices, such as a satellite 20 and/or a station 30. It will be understood that, in some instances, such wireless communication can be more effectively performed when the electronic device 100 has a line of sight to the satellite 20 and/or the station 30.

Accordingly, operation of the electronic device 100 can be conducted while the electronic device 100 is exposed to an external environment. However, such exposure can cause the electronic device 100 to be affected by the conditions thereof. For example, the environment may present temperatures that are lower than the preferred operating temperatures of the electronic device 100. Where the electronic device 100 is operated without protection from such temperatures, the temperature of the electronic device 100 and its components may drop.

When a battery (e.g., lithium-ion battery) of an electronic device 100 is exposed to sufficiently low temperatures (i.e., "freezing temperature threshold"), liquid electrolytes within the battery can freeze. This can cause the oxidation-reduction reactions within the battery (e.g., loss of electrons from anode to cathode) to be disrupted. When insufficient power is provided by the battery, the battery is considered to be "sub-operational." In such a state, the electronic device 100 may turn off and be unable to turn on until the temperature is raised (e.g., to or above the threshold). A sub-operational state can also refer to a state in which low temperatures cause the battery to discharge or otherwise perform abnormally. As such, the electronic device 100 may be unable to perform one or more of its functions.

Accordingly, it can be desirable to operate the electronic device 100 in a manner that raises and/or maintains the temperature of a battery to or above a temperature threshold to maintain operation of the electronic device 100.

While various embodiments and aspects of the present disclosure are illustrated with respect to a mobile electronic device, it will be appreciated that the subject technology can encompass and be applied to other devices. For example, management of power and operational parameters of an electronic device can be implemented on a phone, a tablet electronic device, a laptop, a wearable device, a watch, a game controller, a stylus, a digital media player, a desktop computer, a display, a television, a vehicle, and the like.

Figures 2, 3, 4:
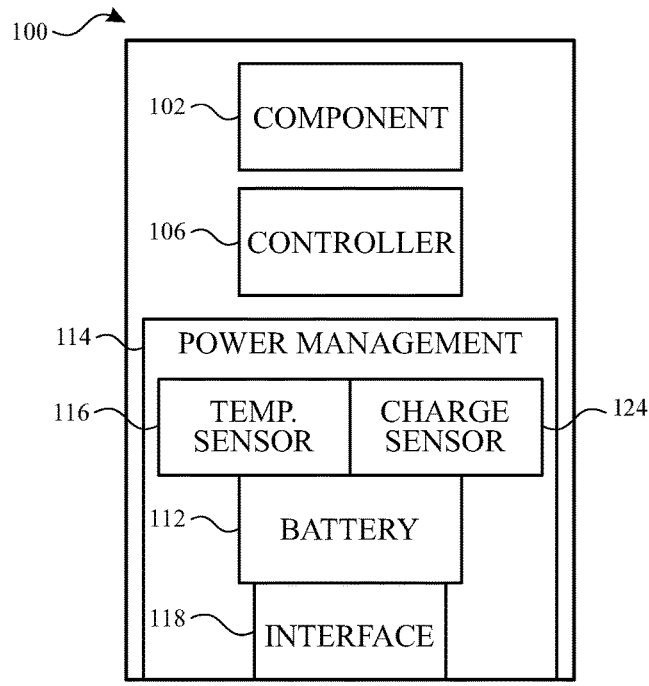
FIG. 2 depicts a block diagram of an electronic device having a power management system, in accordance with various embodiments of the disclosure.
FIG. 3 illustrates a table showing activity levels applied based on conditions of a battery of an electronic device, in accordance with some embodiments of the present disclosure.
FIG. 4 illustrates a table containing a list of operations with corresponding temperature change information, in accordance with some embodiments of the present disclosure.

FIG. 2 depicts a block diagram of an electronic device 100 having a power management system 114 that is configured to control a quantity of power (e.g., a charge) supplied from a battery 112 and to one or more power-consuming components 102 of the electronic device 100, in accordance with various embodiments of the disclosure. Further, the electronic device can include a battery 112. It should be appreciated that the battery 112 may include any number of battery cells, which in turn may be connected in a parallel and/or series arrangement.

In accordance with some implementations, the power management system 114 of the electronic device 100 can include a temperature sensor 116 configured to monitor a temperature experienced by the battery 112. Such measurements can be performed periodically, for example in accordance with a temperature measurement schedule, based on an event, and/or on demand. The temperature sensor 116 can determine whether a temperature of the battery 112 is below a threshold such that performance of the battery 112 is impacted. Operational parameters of the electronic device 100 (e.g., performance of one or more components 102) may be based at least in part on the current temperature of the battery 112. For example, one or more components 102 can be operated in a manner that raises the temperature of the battery 112 to or above a temperature threshold.

The power management system 114 can further include a charge sensor 124 to detect and/or measure one or more parameters of the battery 112 at any given moment and/or across time. For example, the charge sensor 124 of the power management system 114 can be configured to periodically measure or otherwise calculate the charge level of the battery 112 (e.g., a percentage value of remaining battery charge). Operational parameters of the electronic device 100 (e.g., performance of one or more components 102) may be based at least in part on the current charge level of the battery 112. For example, one or more components 102 can be operated in a manner that maintains the charge level of the battery 112 at or above a threshold.

The power management system 114 can include one or more other components, such as a battery cycle count determination component for determining a battery cycle count corresponding to a number of times the battery 112 has been charged and/or discharged. Because the impedance of the battery 112 typically increases with battery cycle count, the battery cycle count may be used as a basis for controlling the operational parameters of one or more components 102.

To charge the battery 112, the electronic device 100 may be coupled to an external power source via a power interface 118. The power interface 118 can include or be coupled to a battery charging circuit that can monitor the battery voltage and vary the charge rate as needed to properly and fully charge the battery 112. The power interface 118 can draw the charge current from the external power source from, for example, a plug-in AC wall outlet adapter, a plug-in DC cigarette lighter adapter (car adapter), a wireless charging circuit, and a serial bus interface charger circuit (e.g., a USB charger circuit), and the like. It will be understood that the battery 112 can gradually discharge while not connected to a power source via the power interface 118 and while one or more components 102 consume the power provided by the battery 112. In such a state, the electronic device 100 can rely solely on the battery 112 to provide power to maintain operations thereof.

The electronic device 100 can include a controller 106 that controls one or more operational parameters of one or more component(s) 102 (e.g., hardware component(s)) based on operation of the power management system 114. For example, the controller 106 can receive an indication of a temperature of the battery 112 and/or a charge level of the battery 112. The controller 106 can operate the one or more components 102 and/or cause the one or more components 102 to operate in a manner that that raises the temperature of the battery 112 to or above a temperature threshold and/or in a manner that maintains the charge level of the battery 112 at or above a charge threshold. While the controller 106 is shown as being separate from the power management system 114, it will be understood that controller 106 can optionally be integrated with and/or part of the power management system 114.

In some embodiments, the component 102 can include a CPU, a GPU, a display, a light, a camera, a network interface, a haptic feedback device, speakers, and the like. It will be understood that the component 102 can optionally include the controller 106, such that the controller's own operational parameters can be controlled based on the power management system 114. Operation of the component 102 can generate heat and/or affect the power consumption of the electronic device 100. The operational parameters of the component 102 can be based at least in part on any of a measured temperature at the battery 112, a current charge level of the battery 112, battery voltage, a determined or calculated battery impedance value, or any other suitable metric or combination thereof, as discussed herein.

The one or more components 102 can be thermally connected to the battery 112. For example, heat generated by the one or more components 102 can be directed actively and/or passively to the battery 112 (e.g., by conduction and/or convection). Heat conducting elements (e.g., heat sink, thermal paste, etc.) can be provided between the component 102 and the battery 112.

One or more of the components 102 may include multiple performance states, where each performance state is associated with a different heat-generation level, temperature change level, and/or power consumption level for that particular component. For example, a CPU and/or a GPU can have different states corresponding to different clock speeds at which the CPU and/or the GPU can be operated. By further example, a display can have different illumination levels corresponding to the amount of light (e.g., brightness) that is output by the display. By further example, a haptic feedback device can have different levels corresponding to the intensity, duration, and/or type of haptic feedback (e.g., vibration) that is output by the haptic feedback device. By further example, a network interface device can have different levels corresponding to the power used to generate outgoing signals (e.g., wireless signals).

One or more of the components 102 may have an active state and an inactive state, such that the corresponding component can be operated for a period of time and not operated for another period of time. For example, background operations related to processing (e.g., indexing data, pre-processing, etc.) can be performed as needed. By further example, communication operations (e.g., fetching mail, preloading webpages, updating applications, etc.) can be performed by a network interface as needed.

FIG. 3 illustrates an example of an activity level selection scenario in a table 300 format, in accordance with some implementations of the disclosure. As shown within the table 300, activity levels and corresponding temperature changes can be selected (e.g., by the power management system 114) based on one or more temperature thresholds and/or battery charge level. Specifically, in some embodiments, when the temperature of the battery is at or above a given temperature threshold, activity levels can be maintained at a lower level and heat generation and/or temperature change can be correspondingly lower. For example, a low activity level can refer to low clock speeds of a processing unit, low output of light by a display, low power wireless transmission, and the like. Additionally or alternatively, the low activity level can refer to performing fewer functions and/or omitting certain functions, such as background processing operations, communication operations, and the like. Performing operations at a lower activity level can generate relatively less heat and change the temperature of the battery by a smaller amount (including no change), as the battery does not require additional heat to be brought to or above the temperature threshold.

In some embodiments, when the temperature of the battery is below the temperature threshold, activity levels can be maintained at a higher level and the resulting temperature change of the battery can be correspondingly higher. For example, a high activity level can refer to high clock speeds of a processing unit, high output of light by a display, high power wireless transmission, and the like. Additionally or alternatively, the high activity level can refer to performing more functions and/or certain functions for a longer duration of time, such as background processing operations, communication operations, and the like. Performing operations at a higher activity level can generate relatively more heat and bring the battery to or above the temperature threshold.

The selection of activity levels and/or operations can be based, at least in part, on a charge level of the battery. For example, when the electronic device is not connected to an external power source, the battery charge level can provide a limited amount of power. Therefore, it can be desirable to manage the temperature in a manner that does not exhaust the remaining power provided by the battery. In some embodiments, when the charge level of the battery is below a given charge threshold, activity levels can be maintained at a lower level to preserve battery power. The lower activity level and corresponding heat generation and/or temperature change can be the same activity level, heat generation, and/or temperature change as described above or a different activity level, heat generation, and/or temperature change as compared to the activity level, heat generation, and/or temperature change that is applied when the temperature of the battery is at or above a given temperature threshold. Performing operations at a lower activity level can consume less power, thereby preserving battery power for other operations and maintaining the electronic device in an on state.

While the table 300 illustrates one temperature threshold and one charge threshold, it will be understood that any number of temperature thresholds and charge thresholds can be applied. For example, 2, 3, 4, 5, 6, 7, 8, 9, or greater than 9 separate thresholds can be applied for each of the temperature and/or the charge level. Where multiple temperature thresholds and/or charge thresholds are applied, a corresponding number of activity levels can be applied depending on whether the temperature and/or the charge level compares to each of the temperature thresholds and/or charge thresholds. For example, 3, 4, 5, 6, 7, 8, 9, or greater than 9 separate activity levels can be available, where one of the activity levels is applied based on whether the temperature and/or the charge level is above or below certain ones of the temperature thresholds and/or charge thresholds. In general, higher activity levels can be applied based on low temperatures and high charge levels of the battery, and lower activity levels can be applied based on high temperatures and low charge levels of the battery. It will be further understood that, rather than discrete thresholds, the temperature and/or charge level of the battery can be compared to a corresponding continuum of values, where a continuously variable range of activity levels can be available for application based on the comparison.

FIG. 4 illustrates an example of a list of operations and corresponding temperature change characteristics in a table 400 format, in accordance with some implementations of the disclosure. The list can be stored in the electronic device or otherwise available (e.g., remotely accessible) to the electronic device for reference. As shown within the table 400, various operations can be available for performance by the electronic device and/or a component thereof. The operation to be performed can be selected based on a comparison of the minimum temperature change that is to achieve a temperature threshold and a determination of whether and/or how performing a candidate operation from the list would achieve the temperature threshold.

For example, each of the operations can have a corresponding temperature change induced when the operation is performed. For example, as shown in FIG. 4, a first operation ("Operation 1") can change the temperature of the battery by a first amount ("+X ° C."), a second operation ("Operation 2") can change the temperature of the battery by a second amount ("+Y ° C."), and a third operation ("Operation 3") can change the temperature of the battery by a third amount ("+Z ° C."). Each of the amounts of temperature change can refer to a different value. For example, the temperature change can be 0° C., 1° C., 2° C., 3° C., 4° C., 5° C., 6° C., 7° C., 8° C., 9° C., or greater than 9° C.

The temperature change induced by any given operation can refer to a net temperature change experienced by the battery. Additionally or alternatively, the operations can be correlated with corresponding amounts of heat generated. Additionally or alternatively, the operations can be correlated with corresponding rates of temperature change while the operation is performed for any given amount of time. Both the operation and the amount of time it is performed can be selected as appropriate based on detected conditions and target outcomes. A selected one of the operations can be performed until the certain results are achieved. As described with respect to FIG. 3, such results can include the temperature of the battery as compared to one or more temperature thresholds and/or the charge level of the battery as compared to one or more charge thresholds.

It will be understood that more than one operation can be selected for performance. For example, the same and/or different operations can be performed in parallel and/or in series. It will be further understood that the selected operation can be changed for a different operation after a duration of time (e.g., when the temperature and/or the charge level of the battery have changed after performance of an initial operation).

The list of operations can further include an amount of power (e.g., from the battery) to perform the operation. Accordingly, the operation to be performed can be selected based on a comparison of the charge level to a charge threshold and a determination of whether the charge level remaining after performance of the operation While only three operations are shown in the table 400, it will be understood that any number of operations can be provided in the list. In some embodiments, the list can be modified based on operations of the electronic device. For example, the temperature of the battery can be monitored throughout various operations of the electronic device. Where an operation is recorded as changing the temperature of the battery by a certain degree and/or generating an amount of heat, then the operation can be added to the list along with its corresponding temperate change and/or heat generation characteristic. Likewise, operations already on the list can be modified based on ongoing measurements of their temperate change and/or heat generation characteristic when such operations are performed.

Figure 5:
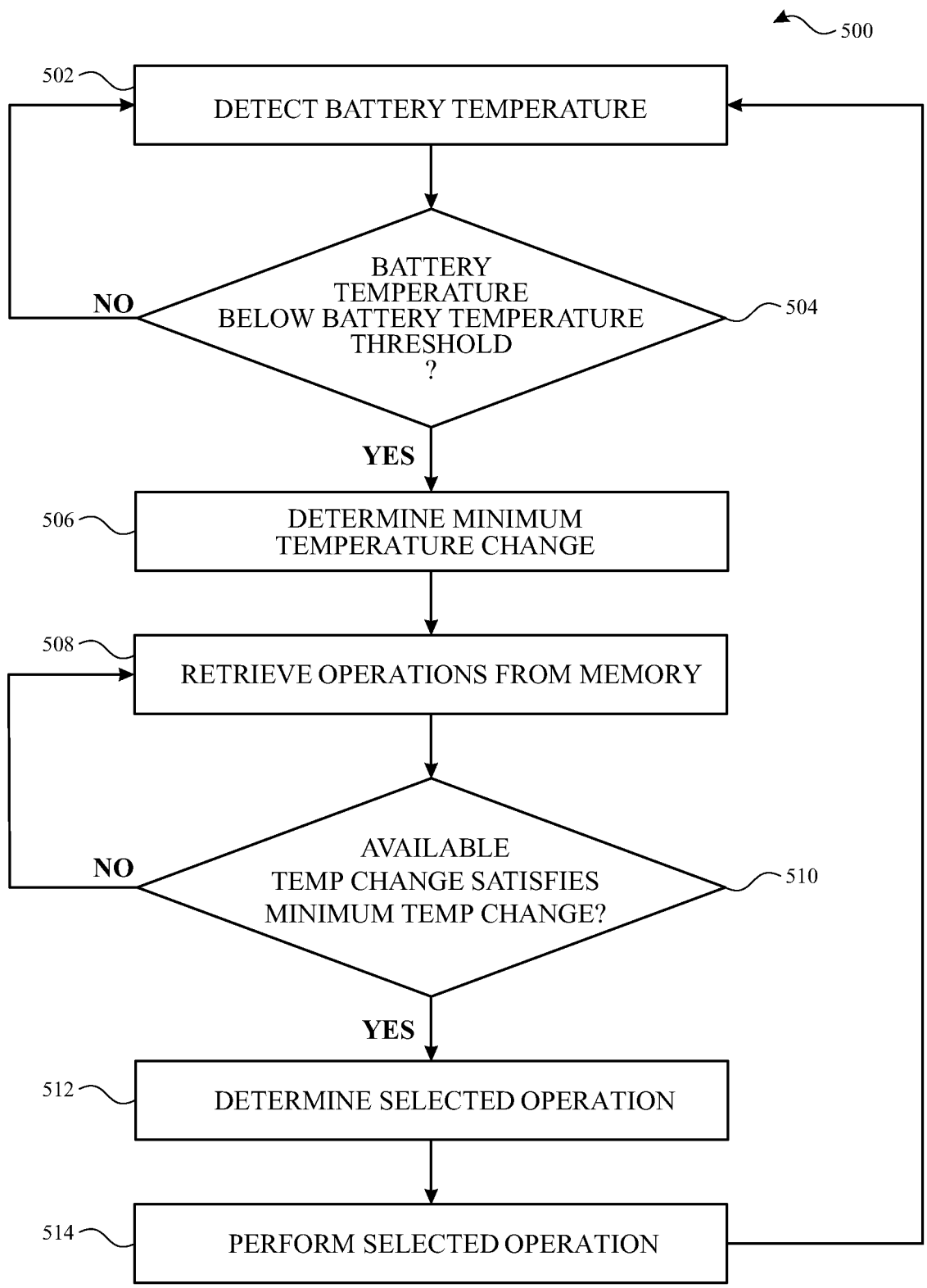
FIG. 5 illustrates a flow diagram for managing operations of an electronic device based on conditions of a battery, in accordance with some embodiments of the present disclosure.

FIG. 5 illustrates a flow diagram of an example process 500 for managing operations of an electronic device in accordance with one or more implementations. For explanatory purposes, the process 500 is primarily described herein with reference to the electronic device 100 of FIGS. 1 and 2. However, the process 500 is not limited to the electronic device 100 of FIGS. 1 and 2, and one or more blocks (or operations) of the process 500 may be performed by one or more other components or chips of the electronic device 100. The electronic device 100 also is presented as an exemplary device and the operations described herein may be performed by any suitable device. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 can begin when the electronic device 100 detects a temperature of a battery (502). Additionally or alternatively, the temperature of the battery can be evaluated based on a rate of change of the battery temperature, detected trends, and/or predictive modeling that projects what the temperature of the battery may be given certain conditions. Additionally or alternatively, the temperature of the battery can be evaluated based on detected or retrieved information regarding other conditions, such as the temperature of the external environment, barometric readings, whether the electronic device is exposed to the external environment (e.g., with an ambient light sensor), temperature conditions at locations within the electronic device other than at the battery, a detected temperature gradient extending away from the battery, and/or known operations of the electronics device and corresponding temperate change and/or heat generation characteristics.

The electronic device 100 can compare the temperature of the battery to one or more battery thresholds (504). If the temperature of the battery is not below a temperature threshold, operations of the electronic device can continue without modification. If the temperature of the battery is below the temperature threshold, further operations can be performed to determine the minimum amount of temperature change that would raise the temperature of the battery to or above the temperature threshold (506).

The electronic device 100 can retrieve a list of operations that are available to be performed, such as the list illustrated in FIG. 4 (508). The electronic device 100 can compare the temperate change and/or heat generation characteristics of one or more of the operations to the minimum temperate change to raise the temperature of the battery to or above the temperature threshold (510). If the available temperate change does not satisfy the minimum temperate change, then a different operation can be considered. If the available temperate change does satisfy the minimum temperate change, then the corresponding operation can be selected and/or further considered (512). Other considerations can include whether the operation would use an excessive amount of battery power in view of the amount of battery power remaining. For example, when the electronic device is not connected to an external power source, the battery charge level can provide a limited amount of power and the operations can be selected to preserve battery power for continued operation of the electronic device.

Where an operation satisfies the criteria applied, the selected operation can be performed by the electronic device 100. The operation can be performed at least until the temperature of the battery is raised to or above the temperature threshold. It will be understood that multiple operations can be performed in parallel or in series. Different operations can be performed based on different temperature thresholds and/or battery thresholds.

Figure 6:
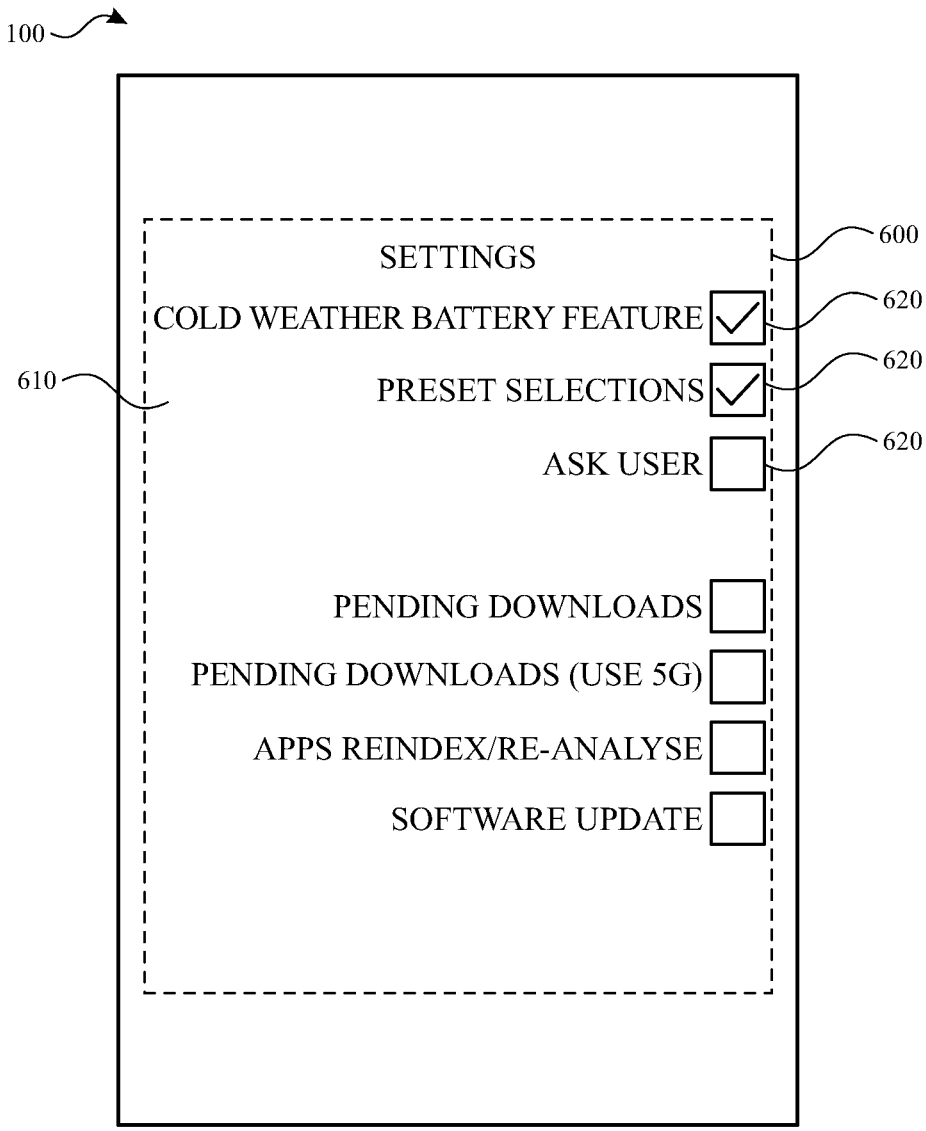
FIG. 6 illustrates a view of an electronic device providing a user interface for managing operations of the electronic device, in accordance with some embodiments of the present disclosure.

FIG. 6 illustrates an example electronic device 100 displaying an example user interface 600 for managing operations of an electronic device in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 100 can include a display screen that displays the user interface 600. The user interface 600 can include a menu 610 with one or more selectable items 620. The selectable items 620 can relate to user-selectable settings for operations to be performed, temperature thresholds, charge thresholds, conditions for performing operations, and the like. In some embodiments, the user can select when and whether the electronic device monitors the battery temperature and/or charge level to determine whether corrective action is appropriate. For example, the user can select whether the detections relating to temperature and/or charge level are performed as a background operation of the electronic device 100. In some embodiments, the user can select whether operations to be performed are preset to be automatically performed upon detection of particular battery temperatures and/or charge levels. In some embodiments, the user can select which one or more of a variety of operations should be performed in response to detection of particular battery temperatures and/or charge levels. In some embodiments, the user can select whether the electronic device is to prompt the user for further input upon detection of particular battery temperatures and/or charge levels.

Figure 7:
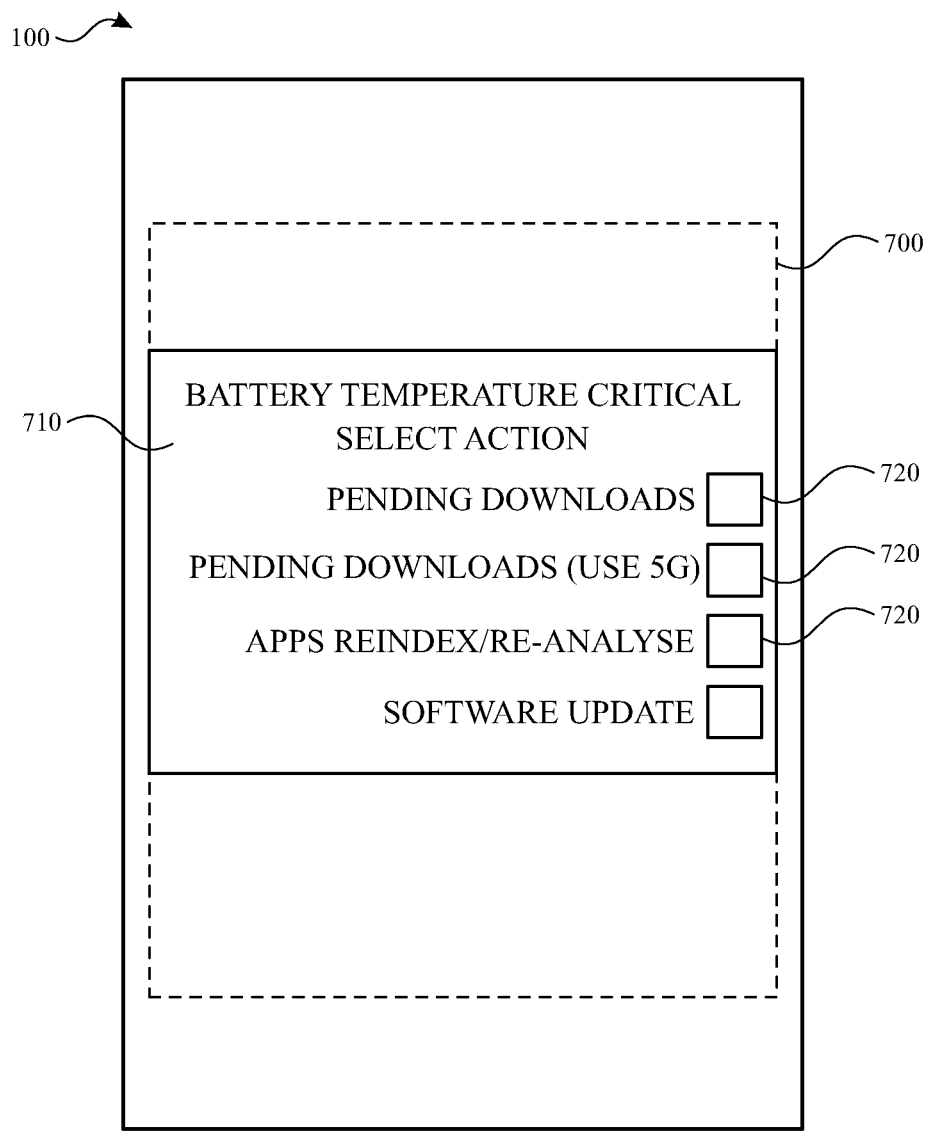
FIG. 7 illustrates a view of an electronic device providing a user interface for managing operations of the electronic device, in accordance with some embodiments of the present disclosure.

FIG. 7 illustrates an example electronic device 100 displaying an example user interface 700 for managing operations of an electronic device in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 100 can include a display screen that displays the user interface 700. The user interface 700 can include a menu 710 with one or more selectable items 720. The menu 710 can be presented in response to detection of particular battery temperatures and/or charge levels. The selectable items 720 can relate to user-selectable settings for operations to be performed, temperature thresholds, charge thresholds, conditions for performing operations, and the like. In some embodiments, the user can select which one or more of a variety of operations should be performed in response to detection of particular battery temperatures and/or charge levels. Upon receipt and/or detection of a user input, the corresponding operation can be performed.

Figure 8:
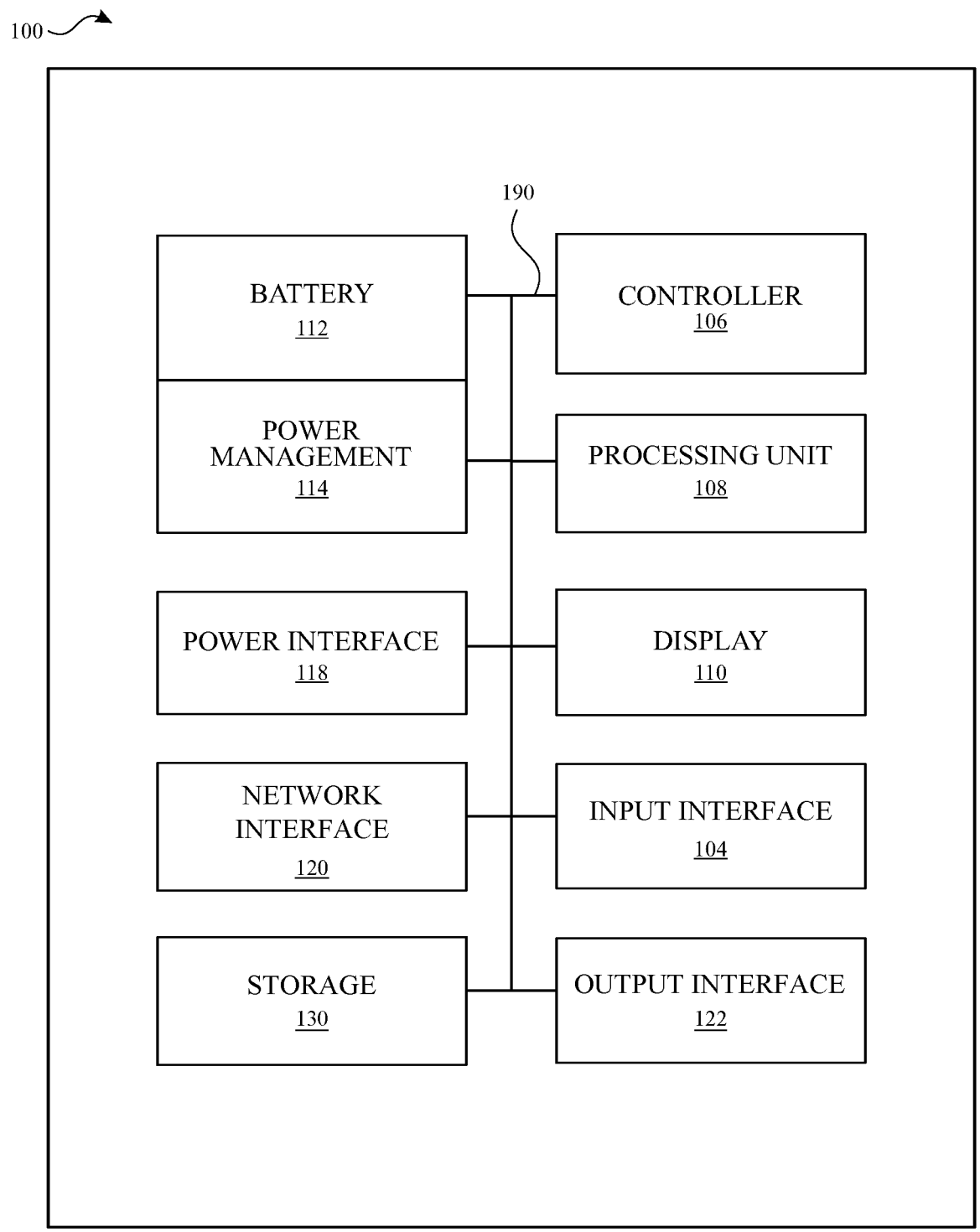
FIG. 8 depicts a block diagram of an electronic device with various components, in accordance with various embodiments of the disclosure.

FIG. 8 conceptually illustrates an electronic device 100 with which one or more implementations of the subject technology may be implemented. The electronic device 100 may include various types of computer readable media and interfaces for various other types of computer readable media. The electronic device 100 can include one or more of a bus 190, a battery 112, a power management system 114, a controller 106, a processing unit 108, a power interface, 118, a display 110, a network interface 120, an input device interface 104, an output device interface 122, a storage 130 (e.g., permanent storage device, system memory, buffer, and/or ROM), and/or subsets and variations thereof. One or more of the above can correspond to and/or be operatively connected to a component of the electronic device (e.g., the component 102 as shown in FIG. 2).

The bus 190 collectively represents all system, peripheral, and chipset buses that communicatively connect the numerous internal devices of the electronic device 100. In one or more implementations, the bus 190 communicatively connects the battery 112, the power management system 114, the controller 106, the processing unit 108, the power interface, 118, the display 110, the network interface 120, the input device interface 104, the output device interface 122, and/or the storage 130. For example, the controller 106 and/or the processing unit 108 can retrieve instructions from the storage 130 to execute and data to process in order to execute the processes of the subject disclosure.

The electronic device 100 may include one or more processing units 108, such as a CPU and/or a GPU that can perform power management and other operations of the electronic device 100, in accordance with one or more embodiments disclosed herein. The controller 106 can include, be included with, and/or be operatively connected to the one or more processing units 108. In this regard, the processing circuitry of the controller 106 and/or the processing units 108 can be configured to perform and/or control performance of one or more functionalities of the electronic device 100 in accordance with various embodiments, and thus, the processing circuitry can perform power and temperature management functions in collaboration with the power management system 114 in accordance with various implementations of the disclosure. The processing circuitry may further be configured to perform data processing, application execution and/or other control and management functions according to one or more embodiments of the disclosure.

The storage 130 can include one or more of a permanent storage device, system memory, buffer, and/or ROM. ROM can store static data and instructions that are needed by the controller 106 and/or the processing unit 108 and other modules of the electronic device 100. A permanent storage device, on the other hand, may be a read-and-write memory device. The permanent storage device may be a non-volatile memory unit that stores instructions and data even when the electronic device 100 is off. In one or more implementations, a mass-storage device (such as a magnetic or optical disk and its corresponding disk drive) may be used as the permanent storage device.

In one or more implementations, a removable storage device (such as a floppy disk, flash drive, and its corresponding disk drive) may be used as the permanent storage device. Like the permanent storage device, system memory may be a read-and-write memory device. However, unlike the permanent storage device, the system memory may be a volatile read-and-write memory, such as random access memory. The system memory may store any of the instructions and data that the controller 106 and/or the processing unit 108 may need at runtime. In one or more implementations, the processes of the subject disclosure are stored in the system memory, the permanent storage device, and/or the ROM. From these various memory units, the controller 106 and/or the processing unit 108 retrieves instructions to execute and data to process in order to execute the processes of one or more implementations.

The bus 190 also connects to the input and output device interfaces 104 and 122. The input device interface 104 enables a user to communicate information and select commands to the electronic device 100. Input devices that may be used with the input device interface 104 may include, for example, alphanumeric keyboards and pointing devices (also called "cursor control devices"). The output device interface 122 and/or a display 110 may enable, for example, the display of images generated by the electronic device 100. Output devices that may be used with the output device interface 122 may include, for example, printers and display devices (including or in addition to the display 110), such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As further shown in FIG. 8, the bus 190 also couples the electronic device 100 to one or more networks and/or to one or more network nodes through the network interface 120. In this manner, the electronic device 100 can be a part of a network of computers (such as a LAN, a wide area network ("WAN"), or an Intranet, or a network of networks, such as the Internet. Any or all components of the electronic device 100 can be used in conjunction with the subject disclosure. Further, the processing circuitry (e.g., the controller 106 and/or the processing units 108) may be in communication with, or otherwise coupled to, a radio frequency (RF) circuit (e.g., the network interface 120) having a modem and one or more wireless communication transceivers. In various implementations, the RF circuit, including the modem and the one or more transceivers, may be configured to communicate using different wireless communication technology types. For instance, in some embodiments the RF circuit may be configured to communicate using various 5G, 4G, 3G, or 1G cellular communication technologies, WiMAX or Wi-Fi communication technologies, Bluetooth communication technologies, etc., without departing from the spirit and scope of the disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

While various embodiments and aspects of the present disclosure are illustrated with respect to temperature management of a battery, it will be appreciated that the subject technology can encompass and be applied to temperature management of other components. Such components can include power sources, such as fuel cells, hydrogen supplies, and/or other power supplies. Such components can include other types of devices. For example, any component of an electronic device that operates optimally in a range of temperatures can be heated as needed by the operations disclosed herein.

Accordingly, embodiments of the present disclosure provide an electronic device that is configured to manage of operations in low temperature environments. Such management can allow the electronic device to remain on and maintain its operations despite exposure to an external environment that presents low temperatures.

Various examples of aspects of the disclosure are described below as clauses for convenience. These are provided as examples, and do not limit the subject technology.

Clause A: an electronic device comprising: a battery; a memory storing a list of operations and, for each corresponding operation, an available temperature change of the battery that would be induced by performing the corresponding operation; and a controller configured to: detect when a temperature of the battery is below a temperature threshold; determine a minimum temperature change to raise the temperature of the battery to the temperature threshold; select one of the operations based at least in part on a comparison of the minimum temperature change and the temperature change of the battery provided by performing the selected operation; and perform the selected operation until the temperature of the battery of the battery is at or above the temperature threshold.

Clause B: a method comprising: detecting when a temperature of a battery of an electronic device is below a temperature threshold; determining a minimum temperature change to raise the temperature of the battery to the temperature threshold; selecting, from a list of operations, a selected operation based at least in part on a comparison of the minimum temperature change and an available temperature change of the battery that would be induced by performing the selected operation; and performing the selected operation until the temperature of the battery of the battery is at or above the temperature threshold.

Clause C: an electronic device comprising: a battery; a component; and a controller configured to: detect a battery temperature of the battery and a battery level; while the battery temperature is above a temperature threshold, operate the component at a first activity level to raise the temperature of the battery by a first amount; and while the battery temperature is below the temperature threshold and the battery level is above a charge threshold, operate the component at a second activity level to raise the temperature of the battery by a second amount, greater than the first amount.

One or more of the above clauses can include one or more of the features described below. It is noted that any of the following clauses may be combined in any combination with each other, and placed into a respective independent clause, e.g., clause A, B, or C.

Clause 1: the controller is further configured to: receive a user input; perform a requested operation in response to the user input; and add the requested operation to the list of operations.

Clause 2: one of the operations comprises communicating with an external device.

Clause 3: the controller is further configured to: when the temperature of the battery of the battery is below the temperature threshold, provide a notification to a user; and receive a user input in response to the notification, wherein determining the selected operation is further based on the user input.

Clause 4: a power interface configured to be coupled to and receive power from an external power source, wherein the controller is configured to perform the selected operation while the power interface is not coupled to the external power source.

Clause 5: the selected operation is performed by controlling a component of the electronic device.

Clause 6: the component is at least one of a central processing unit, a graphics processing unit, or a display component.

Clause 7: wherein the controller is further configured to: detect a battery level; while the temperature of the battery is above the temperature threshold, operate the component at a first activity level to raise the temperature of the battery by a first amount; and while the temperature of the battery is below the temperature threshold and the battery level is above a charge threshold, operate the component at a second activity level to raise the temperature of the battery by a second amount, greater than the first amount.

Clause 8: the controller is further configured to, while the battery level is below the charge threshold, operate the component at the first activity level.

Clause 9: receiving a user input; performing a requested operation in response to the user input; and adding the requested operation to the list of operations.

Clause 10: one of the operations comprises communicating with an external device.

Clause 11: when the temperature of the battery of the battery is below the temperature threshold, providing a notification to a user; and receiving a user input in response to the notification, wherein determining the selected operation is further based on the user input.

Clause 12: detecting a battery level; while the temperature of the battery is above the temperature threshold, operating a component of the electronic device at a first activity level to raise the temperature of the battery by a first amount; and while the temperature of the battery is below the temperature threshold and the battery level is above a charge threshold, operating the component at a second activity level to raise the temperature of the battery by a second amount, greater than the first amount.

Clause 13: operating the component at the first activity level comprises performing a first number of operations; and operating the component at the second activity level comprises performing a second number of operations, greater than the first number of operations.

Clause 14: the component is a processing unit; operating the component at the first activity level comprises operating the processing unit at a first clock speed; and operating the component at the second activity level comprises operating the processing unit at a second clock speed.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device comprising:
   a battery;
   a power interface configured to be connected to and receiving power from an external power source in a first configuration and disconnected from the external power source in a second configuration;
   a memory storing a list of operations and, for each corresponding operation, an available temperature change of the battery that would be induced by performing the corresponding operation, a first operation being performed by at least a first component and a second operation being performed by at least a second component, the first operation and the second operation corresponding to respective activity levels; and
   a controller configured to:
      detect when a temperature of the battery is below a temperature threshold;
      determine a minimum temperature change to raise the temperature of the battery to the temperature threshold;
      compare the minimum temperature change to the available temperature change of each of the operations;
      if one or more of the operations satisfies the minimum temperature change with a corresponding available temperature change, select the one or more of the operations having respective activity levels based on a current charge level of the battery and the minimum temperature change needed to preserve battery power for continued operation of the electronic device; and
      while the power interface is in the second configuration, perform the one or more of the operations by controlling at least one of the first component and the second component until the temperature of the battery is at or above the temperature threshold.

2. The electronic device of claim 1, wherein the controller is further configured to:
   receive a user input;
   perform a requested operation in response to the user input; and
   add the requested operation to the list of operations.

3. The electronic device of claim 1, wherein one of the operations comprises communicating with an external device.

4. The electronic device of claim 1, wherein the controller is further configured to:
   when the temperature of the battery is below the temperature threshold, provide a notification to a user; and
   receive a user input in response to the notification, wherein determining the selected operation is further based on the user input.

5. The electronic device of claim 1, wherein the first component is at least one of a central processing unit, a graphics processing unit, or a display component.

6. The electronic device of claim 1, wherein the battery comprises an electrolyte and the temperature threshold corresponds to a freezing temperature threshold of the electrolyte.

7. The electronic device of claim 1, wherein, below the temperature threshold, the battery provides less power than when the battery is above the temperature threshold.

8. A method comprising:
   detecting when a temperature of a battery of an electronic device is below a temperature threshold;
   determining a minimum temperature change to raise the temperature of the battery to the temperature threshold;
   determining an available temperature change of each of multiple operations in a list, a first operation being performed by at least a first component and a second operation being performed by at least a second component, the multiple operations having respective activity levels;
   comparing the minimum temperature change to the available temperature change of each of the multiple operations;
   select from the multiple operations based on a charge level of the battery and the minimum temperature change needed to preserve battery power for continued operation of the electronic device; and
   while the electronic device is disconnected from an external power source, performing a combination of the multiple operations that satisfies the minimum temperature change by controlling at least one of the first component and the second component until the temperature of the battery is at or above the temperature threshold.

9. The method of claim 8, further comprising:
   receiving a user input;
   performing a requested operation in response to the user input; and
   adding the requested operation to the list of operations.

10. The method of claim 8, wherein one of the operations comprises communicating with an external device.

11. The method of claim 8, further comprising:
    when the temperature of the battery of the battery is below the temperature threshold, providing a notification to a user; and
    receiving a user input in response to the notification, wherein determining the selected operation is further based on the user input.

12. The electronic device of claim 8, further comprising:
    detecting a battery level;
    while the temperature of the battery is above the temperature threshold, operating a component of the electronic device at a first activity level to raise the temperature of the battery by a first amount; and
    while the temperature of the battery is below the temperature threshold and the battery level is above a charge threshold, operating the component at a second activity level to raise the temperature of the battery by a second amount, greater than the first amount.

13. The electronic device of claim 12, further comprising, while the battery level is below the charge threshold, operating the component at the first activity level.

14. An electronic device comprising:
    a battery;
    a component;
    a power interface configured to be coupled to and receive power from an external power source; and
    a controller configured to, while the power interface is not coupled to the external power source:
       detect a battery temperature of the battery and a battery level;
       select from multiple operations based on the battery level of the battery and a minimum temperature change of the battery needed to preserve battery power for continued operation of the electronic device, the multiple operations including a first operation having a first activity level and a second operation having a second activity level;
       while the battery temperature is above a temperature threshold and the battery level is above a charge threshold, operate the component at the first activity level to raise the battery temperature by a first amount; and while the battery temperature is below the temperature threshold and the battery level is above the charge threshold, operate the component at the second activity level to raise the battery temperature by a second amount, greater than the first amount.

15. The electronic device of claim 14, wherein the controller is further configured to, while the battery level is below the charge threshold, operate the component at the first activity level.

16. The electronic device of claim 14, wherein the component is at least one of a central processing unit, a graphics processing unit, or a display component.

17. The electronic device of claim 14, wherein:

operating the component at the first activity level comprises performing a first number of operations; and operating the component at the second activity level comprises performing a second number of operations, greater than the first number of operations.

18. The electronic device of claim 14, wherein:

the component is a processing unit;

operating the component at the first activity level comprises operating the processing unit at a first clock speed; and operating the component at the second activity level comprises operating the processing unit at a second clock speed.

19. The electronic device of claim 14, wherein:

the component is a first component;

the electronic device further comprises a second component; and the controller is further configured to, while the battery temperature is below the temperature threshold and the battery level is above the charge threshold, operate the second component to raise the battery temperature.

20. The electronic device of claim 1, wherein:

when a charge level of the battery is above a charge threshold, the one or more of the operations is performed above a selected activity level; and when the charge level of the battery is below the charge threshold, the one or more of the operations is performed below the selected activity level.

* * * * *